US006486773B1

United States Patent
Bailie et al.

(10) Patent No.: US 6,486,773 B1
(45) Date of Patent: Nov. 26, 2002

(54) METHOD FOR COMMUNICATING DATA IN A REMOTE TIRE PRESSURE MONITORING SYSTEM

(75) Inventors: Ivan Andrew David Bailie, Kells (IE); Dermot Murphy, Bangor (IE)

(73) Assignee: Schrader-Bridgeport International, Inc., Deerfield, IL (US)

( * ) Notice: Subject to any disclaimer, the term of this patent is extended or adjusted under 35 U.S.C. 154(b) by 0 days.

(21) Appl. No.: 09/245,577

(22) Filed: Feb. 5, 1999

Related U.S. Application Data

(60) Provisional application No. 60/099,820, filed on Sep. 10, 1998.

(51) Int. Cl.[7] .............................................. B60C 23/00
(52) U.S. Cl. ..................... 340/445; 340/442; 340/447
(58) Field of Search ................. 340/442, 443, 340/444, 445, 446, 447, 448, 10.2; 73/146.2, 146.3, 146.4, 146.5; 370/448

(56) References Cited

U.S. PATENT DOCUMENTS

| | | | |
|---|---|---|---|
| 4,142,184 A | * 2/1979 | Lake | ............................ 340/347 |
| 4,529,961 A | 7/1985 | Nishimura et al. | |
| 4,609,905 A | 9/1986 | Uzzo | |
| 5,109,213 A | 4/1992 | Williams | |
| 5,289,160 A | 2/1994 | Fiorletta | |
| 5,600,301 A | * 2/1997 | Robinson, III | ............... 340/442 |
| 5,661,651 A | 8/1997 | Geschke et al. | |
| 5,963,128 A | * 10/1999 | McClelland | ................. 340/447 |
| 5,969,595 A | * 10/1999 | Schipper et al. | ............. 340/426 |
| 5,999,091 A | * 12/1999 | Wortham | ...................... 340/431 |
| 6,003,146 A | * 12/1999 | Beutler | ......................... 714/701 |
| 6,097,278 A | * 8/2000 | Arnold et al. | .............. 340/10.1 |

* cited by examiner

*Primary Examiner*—Nina Tong
(74) *Attorney, Agent, or Firm*—Brinks Hofer Gilson & Lione

(57) ABSTRACT

A method and apparatus for communicating data in a remote tire pressure monitoring system (10) which includes a plurality of transmitters (12) associated with tires (T(1), T(2), T(3), and T(4)) of a vehicle (V) and a receiver (14) in radio communication with the plurality of transmitters. At each tire, data is collected (82), the data being representative of a tire characteristic, such as tire pressure. Data representative of the tire characteristic is transmitted (86). After a time delay (94, 96) next data are transmitted (98) until a predetermined number of data words have been transmitted. The time delay for each respective data word is defined according to a repeating pattern common to the plurality of tires so that data words are transmitted during a plurality of aperiodic time windows.

26 Claims, 3 Drawing Sheets

METHOD FOR COMMUNICATING DATA IN A REMOTE TIRE PRESSURE MONITORING SYSTEM

CROSS REFERENCE TO RELATED APPLICATIONS

This application claims priority of U.S. provisional application serial No. 60/099,820, filed Sep. 10, 1998.

FIELD OF THE INVENTION

The present invention relates to a method for communicating data in a remote tire pressure monitoring system.

BACKGROUND

Remote tire pressure monitoring systems have been developed using radio technology for providing centralized tire pressure information to an operator of a vehicle. Such systems typically include a plurality of sending units or transmitters associated with the tires of a vehicle, such as an automobile, truck or other wheeled vehicle along with a receiving unit. The transmitters measure a tire characteristic such as tire air pressure, and communicate data corresponding to the tire characteristic to the receiver. The receiver takes some action in response to the data, such as providing an alarm or providing a display indicative of the tire characteristic, for the operator of the vehicle.

One problem evident in such a system is clashing of data at the receiver. If two transmitters transmit data at the same time, a clash can occur, in which case the receiver is unable to reliably decode the two transmissions. Any overlap of two transmissions from sending units can prevent reception of data from both sending units.

One known solution involves interrupting transmission of data during selected repeating time periods at each transmitter. The total transmission time is divided into a number of sections, such as ten. During selected sections, for example, two of the ten, transmission is suspended to provide a quiet time when data from other sending units may be transmitted and received successfully. If the quiet times of three of four sending units align during a time when the fourth sending unit is transmitting, no clash will occur. If two transmissions from the same sending unit are decoded and are identical, the data is considered valid and reliable.

While this technique has been acceptable, it would be advantageous to further limit clashing to more reliably and more quickly communicate tire characteristic information to the vehicle operator. Accordingly, there is a need for an improved method and apparatus for transmitting data in a remote tire pressure monitoring system which reduces clashing of data.

SUMMARY

The present invention is directed to a method for transmitting data in a remote tire pressure monitoring system. One embodiment of the system includes transmitters located at each tire of a vehicle and a receiver mounted on the vehicle.

By way of introduction, the method includes collecting data on a tire characteristic at tires of a vehicle. The data are formatted and transmitted by the transmitter according to a predefined protocol. In one embodiment, each transmitter sends the data during a sequence of aperiodic time windows. Because the time windows are aperiodic, the likelihood of simultaneous or overlapping transmission by two or more transmitters is reduced. In another embodiment, each transmitter waits a variable time delay before beginning its transmission of data. Because the transmitters begin transmitting at differing times, the likelihood of overlapping transmission by two or more transmitters is reduced.

The foregoing description of the present invention has been provided only by way of introduction. Nothing in this section should be taken as a limitation on the following claims, which define the scope of the invention.

DETAILED DESCRIPTION OF THE PRESENTLY PREFERRED EMBODIMENTS

Figure 1:
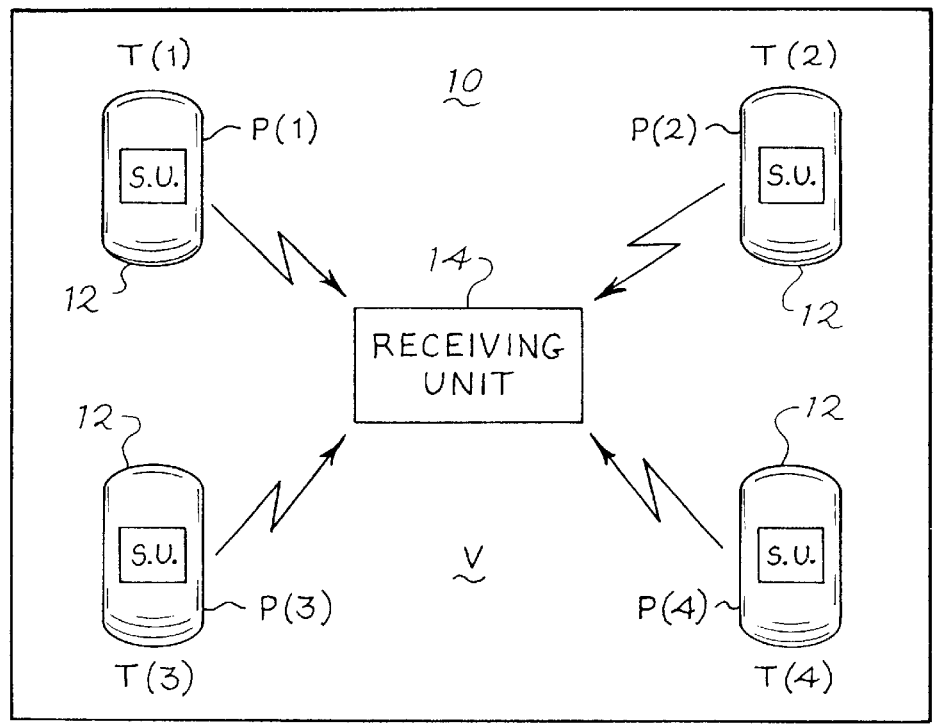
FIG. 1 is a block diagram of a remote tire pressure monitoring system.

Turning now to the drawings, FIG. 1 shows a block diagram of a vehicle V that includes in this example four tires. The vehicle V includes a remote tire pressure monitoring system 10 that, in this example, includes four sending units or transmitters 12 and a receiving unit 14. Each of the transmitters 12 includes a battery powered, radio frequency (RF) transmitter that periodically transmits RF signals indicative of pressure or other tire characteristic of the associated tire. In this example, the tires are labelled T(1), T(2), T(3), T(4), and the associated tire pressures are identified as P(1), P(2), P(3), P(4). Structure and operation of the transmitters 12 will be described in further detail in connection with FIG. 4. The receiving unit 14 receives RF signals from the transmitters 12 and provides a warning to the operator of the vehicle V when the indicated tire pressure of any of the tires is outside a predetermined range.

Figure 2:
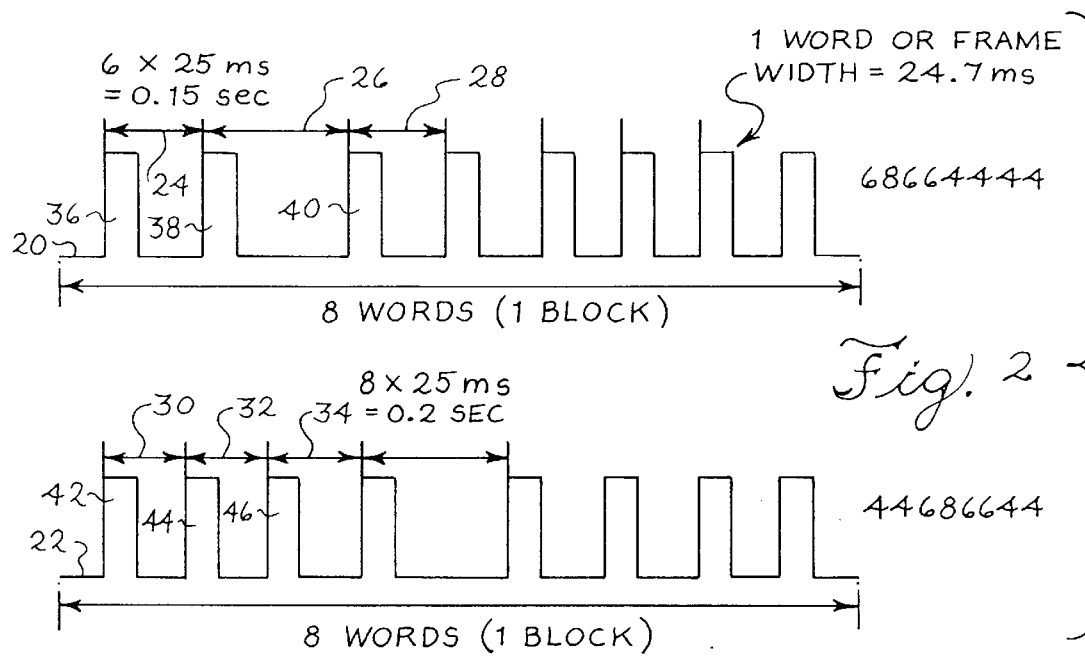
FIG. 2 is a timing diagram illustrating data transmission by the transmitter of FIG. 2.

FIG. 2 is a timing diagram illustrating a method for transmitting data in a remote tire pressure monitoring system, such as the system 10 illustrated in FIG. 1. FIG. 2 includes two waveforms, including a first waveform 20 illustrating data transmission from a first sending unit or transmitter of the remote tire pressure monitoring system and a second waveform 22 illustrating data transmission from a second transmitter of the remote tire pressure monitoring system. FIG. 2 illustrates one block or frame of transmitted data. Each block or frame includes transmission of eight words of data during eight respective time windows. Blocks are preferably repeated at a repetition rate or update frequency. The update frequency may be selected to be on the order of seconds, minutes or hours, or any other suitable rate. Also, as will be discussed below, the update frequency may be varied depending on the mode of operation of the tire including the transmitter, such as stationary or rolling.

In the illustrated embodiment, data representative of a tire characteristic, such as tire pressure data, are transmitted in a pattern represented by the waveforms of FIG. 2. Preferably, identical data words are transmitted during sequential time windows. Thus, the first transmitter transmits a data word during a time window 24 of the waveform 20, retransmits the data word during a subsequent time window 26, retransmits the data word during a subsequent time window 28, etc. Similarly, the second transmitter transmits a data word during a first time window 30, retransmits the data word during a second time window 32, retransmits the data word during a third time window 34, etc. In this manner, data are repeatedly transmitted by each of the sending units or transmitters in the system to increase the likelihood that the receiver will receive and decode the data without clashing.

During each time window, a transmitter transmits a data word during a transmit time, when the transmitter actively transmits data, followed by a variable duration silent time, when the first transmitter does not transmit. This continues until a predetermined number of data words have been transmitted. In the illustrated example, the transmit time during all time windows is uniformly 24.7 ms. This time is determined by the composition and duration of the transmitted word, which will be described in further detail below in conjunction with FIG. 3. Other word composition and timing may be used as well. For the waveform 20, the time window 24 includes a transmit time 36. The reminder of the time window 24 is silent time. Similarly, the time window 26 includes a transmit time 38 followed by a silent time until the start of a transmit time 40 of the time window 28. For the second waveform 22, the time window 30 includes a transmit time 42 followed by a silent time. The next time window 32 includes a transmit time 44 followed by a silent time and the time window 34 includes a transmit time 46 followed by a silent time. The reminder of the time windows of both the waveform 20 and the waveform 22, used by the first transmitter and the second transmitter in the remote tire pressure monitoring system, respectively, are structured similarly.

As is illustrated in FIG. 2, time windows for data transmission from each sending unit are aperiodic. While the time windows occur sequentially, their spacing in time is not defined by a regular periodicity. Rather, the start of successive time windows is timed in response to a predetermined duration code. The predetermined duration code used to define the waveform 20 is illustrated in FIG. 2 adjacent to the waveform 20. The code used in this example is 68664444. Similarly, the predetermined duration code used to define the waveform 22 is illustrated in FIG. 2 next to the waveform 22. This code is 44686644. Each transmitter stores a local copy of this code so that the code is common to all tires of the vehicle.

The timing of each time window is measured using the predetermined duration code. For example, referring to waveform 20 of FIG. 2, the first time window 24 has a duration of 0.15 seconds. This duration is set by multiplying the first element of the predetermined duration code, 6, by a time unit, in this example 25 ms. Any other suitable time unit may be chosen. The subsequent time window 26 has a duration of a 8×25 ms=0.2 seconds. Similarly, the next time window 28 has a duration 6×25 ms=0.15 seconds. Thus, the start of successive time windows is timed in response to the predetermined duration code. Since the transmit time of each time window has a uniform length, 24.7 ms in this example, the duration of the silent time is similarly timed in response to the predetermined duration code.

In the illustrated embodiment, the predetermined duration code is common to all the transmitters in the remote tire pressure monitoring system. However, each transmitter in the system is set to begin at a different location in the code. Thus, the first transmitter having a timing diagram illus trated as waveform 20 begins operating using the code 686 . . . for timing the transmission time windows. The second transmitter having a timing diagram illustrated by waveform 22 begins by using the code 446 . . . for timing transmission time windows. Over multiple repetitions of the code, the transmissions from the transmitters follow the same pattern. However, because of use of different starting points in the code at each transmitter, the transmissions from any plurality of transmitters will not be synchronized, reducing the likelihood of clashing of those transmissions at the receiver.

In the illustrated embodiment, the same data word or words are transmitted during each time window. In alternative embodiments, however, data may be updated, for example by taking an additional tire pressure measurement. Updated data are then transmitted in subsequent data words, using the predetermined duration code for timing the time windows of transmission. Thus, after data representative of a tire characteristic have been collected, a data word is transmitted in response to the data during the active time of the first time window. After a time delay, which is defined at least in part by a repeating pattern such as the predetermined duration code, a next data word is transmitted at the beginning of the subsequent time window. The steps of transmitting a data word and, after a time delay, transmitting a next data word are repeated for a predetermined number of data words, such as eight data words. The time delay for each respective data word is defined according to the repeating pattern. As noted above, the repeating pattern is preferably common to the plurality of tires by using the same code at the different tires. However, a different pattern may be used. The duration code or repeating pattern illustrated in the drawing has been determined by simulation to be beneficial at reducing clashing of data at a receiver in a remote tire pressure monitoring system. However, other patterns may be used for transmitting data words responsive to collective data during a plurality of aperiodic time windows.

Figure 3:
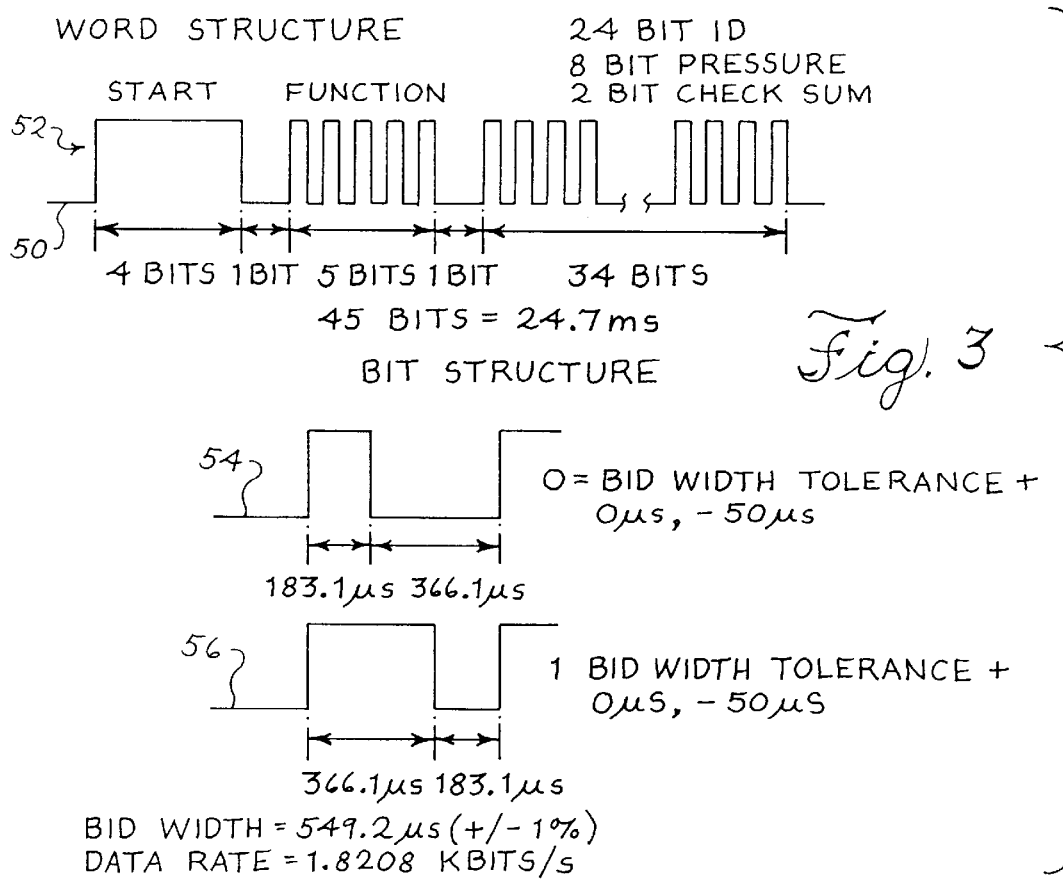
FIG. 3 is a series of timing diagrams showing an example of word and bit structure for data transmitted in accordance with the timing diagram of FIG. 2.

FIG. 3 illustrates exemplary word and bit formatting for use in the data transmission technique illustrated in FIG. 2. In FIG. 3, a waveform 50 shows an exemplary word 52 which consists of 45 bits of information. The word 52 includes a four bit start code followed by a single bit, five bits defining a function code, again followed by a single bit followed by 34 additional data bits. The 34 data bits are distributed between a 24 bit unique identification code (ID) and 8 bits representative of a tire characteristic such as air pressure measured by the sending unit which transmits the word. The 24-bit unique identification code is used to identify the tire associated with the reported tire characteristic. Also, a two-bit check sum is included to verify reliable reception of the word.

Also in FIG. 3, a waveform 54 and a waveform 56 illustrate the structure of bits defining a logical 0 and a logical 1, respectively. The illustrated embodiment uses pulse width modulation (PWM) to transmit data. Exemplary bit width and data rate details are provided in FIG. 3 for one embodiment of the present invention.

It should be noted that the word structure and bit structure illustrated in FIG. 3 are exemplary only and are not required for successful operation of a system employing the present invention. Alternative embodiments may be employed successfully. For example, rather than employing a pulse width modulation protocol, a Manchester coding protocol may be used for reliable transmission of data. Such alternative embodiments may be chosen to provide a faster data communication rate or reduced power consumption in the sending unit transmitting the data.

Figure 4:
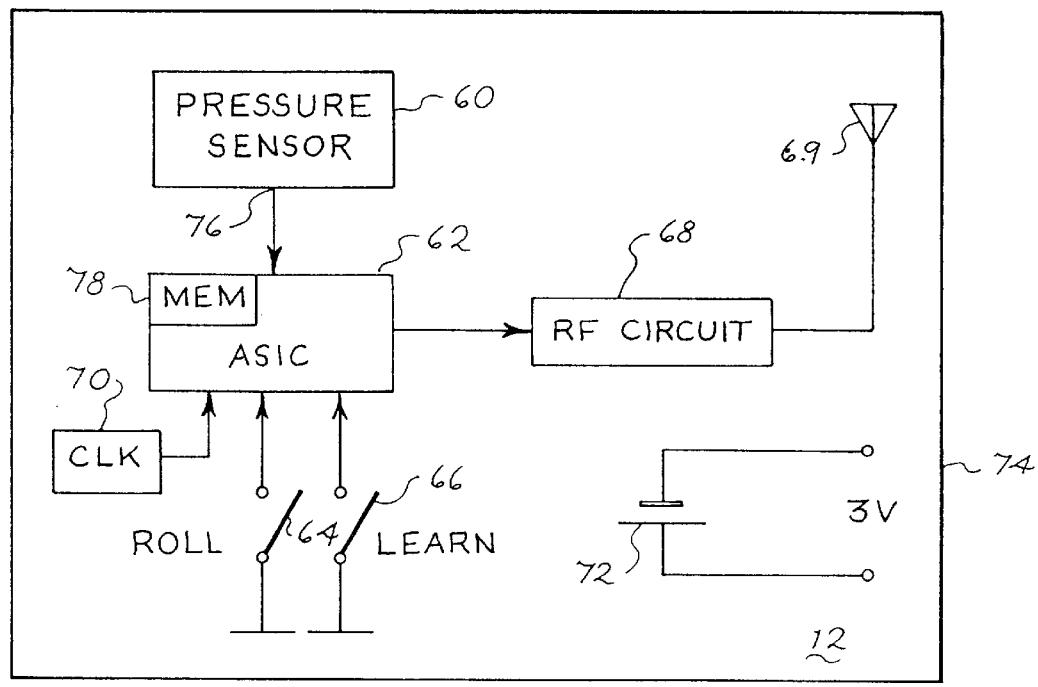
FIG. 4 is a block diagram of a transmitter for use in the remote tire pressure monitoring system of FIG. 1.

FIG. 4 shows a block diagram of a sending unit for a transmitter 12 for use in the remote tire pressure monitoring system 10 of FIG. 1. The transmitter 12 includes a pressure sensor 60, a controller 62, a roll switch 64, a learn switch 66, a radio frequency (RF) circuit 68 and an antenna 69, a clock 70, and a battery 72. The components of the transmitter 12 are contained within a housing 74. The transmitter is intended to be mounted on or within a tire of a vehicle for detecting a characteristic of the tire and transmitting data representative of the characteristic to a receiver such as the receiving unit 14 of the remote tire pressure monitor system 10 of FIG. 1. In the illustrated embodiment, the tire characteristic is air pressure of the tire. However, other tire characteristics may be measured, such as tire temperature, number of rotations of the tire, etc.

The pressure sensor 60 forms a sensor for detecting an operating condition of the tire associated with the transmitter 12 and producing an indication at an output 76. In the illustrated embodiment, the pressure sensor 60 is a pressure transducer which detects air pressure of the tire and produces either an analog signal or digital data representative of the tire pressure at the output 76.

The controller 62 controls operation of the transmitter 12. In the illustrated embodiment, the controller 62 is implemented as an application specific integrated circuit (ASIC). In alternative embodiments, the controller 62 may be implemented as a general purpose microprocessor or hard wired circuitry. The ASIC implementation provides advantages of reduced size, weight, cost and power drain, which are all important design considerations for the transmitter 12.

The controller includes various circuitry for receiving input signals, operating on the input signals and providing output signals. In particular, the controller 62 includes a data receiving circuit configured to receive the indication of the tire pressure from the output 76 of the pressure sensor 60. The data receiving circuit may be, for example, an analog to digital converter. Further, the controller includes a control circuit which formats data words in response to the indication for communication to a remote receiver during a plurality of aperiodic time windows, for example as is illustrated in FIG. 2. Still further, the controller 62 includes a memory 78 coupled to the control circuit of the controller for storing data.

The RF circuit 68 is coupled to the controller 62 for RF transmission of data words to a remote receiver. This may be accomplished by any suitable method, for example modulation by the data words of a carrier signal, with the modulated carrier being impressed upon the antenna 69 for RF transmission of the data.

The clock 70 provides a timing circuit coupled to the controller 62 to establish reference timing for the transmitter 12. The controller 62 is responsive to the reference timing for timing operation of the transmitter 12. For example, the controller 62 formats data words for transmission during aperiodic time windows to a remote receiver. The controller 62 is responsive to reference timing to space the aperiodic time windows in time according to a repeating pattern. In the illustrated example, the repeating pattern is stored in the memory 78 and is, for example, the repeating pattern 68664444 . . . illustrated in FIG. 2. Thus, in one exemplary embodiment, the controller 62 selects an element of the code which forms the repeating pattern from the memory 78. The controller 62 multiplies a time unit, such as a 25 ms, by the selected element, and, in response to reference timing established by the clock 70, times the start of a subsequent time window. In this manner, the transmitter 12 is configured to transmit a data word during a time window, wait a predetermined variable time defined at least in part by the repeating pattern, and transmit a next data word during a next time window.

As noted, the codes which form the repeating pattern are preferably stored in the memory 78. Alternatively, the codes may be calculated or determined in any suitable manner. In the preferred embodiment, the codes are stored in the memory 78 at the time of manufacture of the transmitter 12. Further, the starting point in the code used by the controller 62 when transmitting first data words is set randomly. This can be done by storing the code with a random starting location or by randomly selecting the starting point in the code at the controller 62.

The roll switch 64 detects a rotational characteristic of a tire associated with the transmitter 12, such as rolling at a specified speed, and provides an indication when the rotational characteristic exceeds a predetermined threshold. In the illustrated embodiment, the roll switch 64 includes a reed switch which closes at a specified g force (i.e., a multiple of the acceleration due to gravity). In response to closing of the roll switch 64, the controller 62 responds by, for example, increasing the sampling and transmission rates of the transmitter 12. For example, in one embodiment, when a vehicle employing the transmitter 12 begins moving at a speed exceeding 30 km/h, the roll switch 64 closes. In response, the controller 62 reads the indication of air pressure provided by the pressure sensor 60 at an increased rate and closes the RF circuit 68 to transmit data words indicative of the air pressure also at an increased rate. In this example, when the vehicle is stationary or moving at a speed below the threshold of 30 km/h, the sample rate as determined by the controller 62 is approximately one sample every 15 minutes. The transmission rate, also referred to as the update rate or update frequency, is approximately one transmission of eight identical data words every sixty minutes. After the roll switch 64 closes, the sample rate is increased by the controller 62 to one sample per 10 seconds and the transmission rate is increased to one transmission every one minute, increasing the update frequency. Thus the illustrated transmitter 12 provides an increased pressure monitoring mode with more frequent sampling and transmission when the vehicle is in motion. After the vehicle is again stationary and the roll switch 64 opens, the controller 62 reduces the sample and transmission rate.

In one embodiment, the roll switch 64 closes at a specified g force value which is selected from a range of values. In one example, the range of g force values varies from 6.1 to 12.2 times the acceleration due to gravity. The selected g force value for a particular roll switch 64 is set randomly during manufacture of the transmitter 12. The roll switches as supplied have a natural spread of switching points. In this manner, each of the respective transmitters 12 associated with the tire of a vehicle will employ differing g force values for activating the increased pressure monitoring mode. Since this mode corresponds to an increase in RF transmissions by the transmitter 12 as well as all other transmitters used by the vehicle, this mode will correspond to an increased likelihood of clashing at the receiver. By spreading the a range of g force values at which the transmitters switch to the increased pressure monitoring mode, the likelihood of clashing or word collision at the receiver is decreased.

Figure 5:
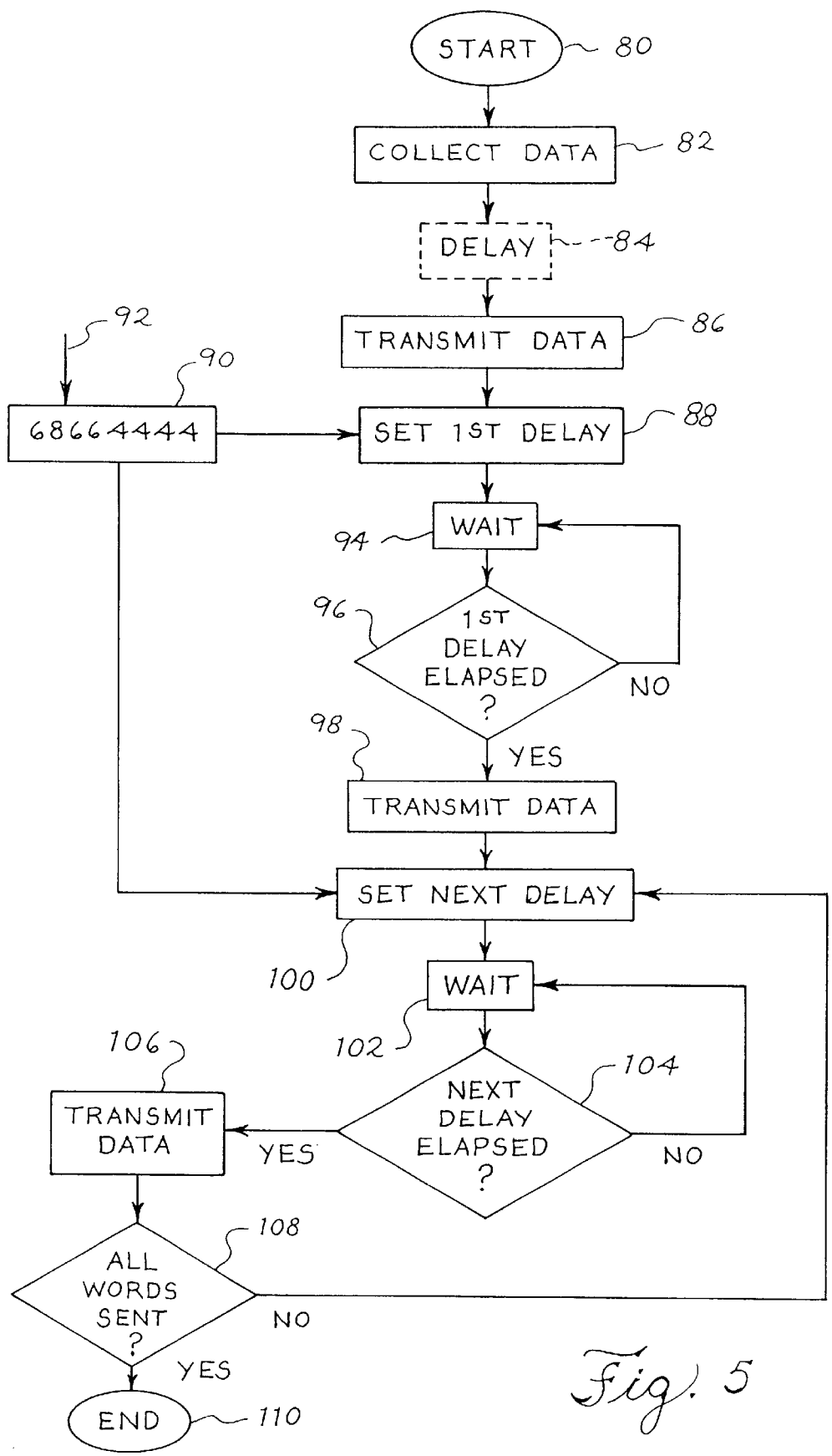
FIG. 5 is a flow diagram illustrating a method for operating the transmitter of FIG. 2.

Referring now to FIG. 5 it shows a flow diagram illustrating a method for transmitting data in a remote tire pressure monitoring system. The method begins at step 80.

At step 82, data representative of a characteristic of a tire are collected. For example, pneumatic air pressure, temperature or other physical characteristic of the tire may be measured. At step 84, which is shown in dashed lines to indicate it is an optional step, the method includes waiting a variable delay time before step 86, transmitting data.

Preferably, the variable delay time is different from variable delay time used by other transmitters in the remote tire pressure monitoring system. In this manner, the likelihood of word collision or clashing upon reception at a receiver in the system is reduced. At step 86, data are transmitted using any suitable data transmission technique.

At step 88, a first delay time is determined. In the illustrated embodiment, the first delay time is illustrated using a first data element of a repeating pattern contained in a memory 90 or other storage location. A pointer 92 points to the current element of the repeating pattern to be used for determining the delay time. In the illustrated embodiment, the repeating pattern includes a plurality of integer numbers, such as the exemplary pattern 68664444. One integer number of a plurality of integer numbers is selected in sequence for combination with a time unit, such as a standard time duration. Upon exhaustion of the sequence, the pointer returns to a first element of the repeating pattern and the sequence is repeated. In other embodiments, other techniques may be used for establishing the repeating pattern.

After determining the first delay time, the method, at step 94 and step 96 enters a loop to await elapse of the first delay time. If the first delay time has elapsed, the method proceeds to step 98 where next data words are transmitted. Transmission may be by any suitable method for reliable reception of the data words.

At step 100, a next delay time is determined using a next data element of the repeating pattern stored in the memory 90. For example, the pointer 92 is incremented to point to the next data element. After determining the next delay time, the method enters a loop including step 102 and step 104 to await the duration of the next delay time. After the next delay time has elapsed, step 104, next data words are transmitted, at step 106. At step 108, the method determines if all data words designated for transmission have been sent. For example, a predetermined number of data words, such as 8 data words, may be transmitted together as a block. If all data words have not yet been sent, control returns to step 100 to set a next delay time using the predetermined pattern contained in the memory 90. Instead if all data words have been sent the method ends at step 110.

As can be seen from the foregoing, the preferred embodiment provides a method and apparatus for transmitting data in a remote tire pressure monitoring system. The system includes a plurality of transmitters associated with tires of a vehicle and a receiver in radio communication with the plurality of transmitters. At each of the transmitters, data representative of a tire characteristic is collected and formatted for transmission to the receiver. Each transmitter transmits data words during a plurality of aperiodic time windows. The aperiodic time windows tend to randomize the time of transmission of the data words from each of the respective transmitters. This reduces the likelihood of coincident reception of data words at the receiver and therefore improves the likelihood of accurate, reliable reception of data at the receiver.

While a particular embodiment of the present invention has been shown and described, modifications may be made. For example, different tire characteristics may be monitored and reported to the receiving unit. Also, in another modification, instead of varying the duration of the time windows of transmission, the silent time when a transmitter does not transmit may be varied. It is therefore intended in the appended claims to cover all such changes and modifications which follow in the true spirit and scope of the invention.

What is claimed is:

1. A method for transmitting data in a remote tire pressure monitoring system, the method comprising the acts of:

at each tire of a plurality of tires of a vehicle, collecting data representative of a tire characteristic; and at each respective tire, transmitting data words responsive to the data representative of the tire characteristic during a plurality of time windows, transmission timing of the plurality of timing windows being defined by a preassigned, respective different starting point of a predetermined, multiple-valued code common to the plurality of tires of the vehicle to form a unique code for the respective tire.

2. The method of claim 1 wherein said act of transmitting data words comprises the act of transmitting a data word during a transmit time followed by a variable duration silent time until a predetermined number of data words have been transmitted.

3. The method of claim 2 further comprising the act of timing duration of the silent time in response to the unique code for the respective tire.

4. The method of claim 1 her comprising the act of timing start of successive time windows in response to the unique code for the respective tire.

5. The method of claim 4 wherein the unique code for the respective tire comprises a portion of the predetermined, multiple-valued code common to the plurality of tires of the vehicle.

6. The method of claim 1 wherein said act of transmitting data words comprises transmitting identical data words during sequential time windows.

7. The method of claim 1 further comprising the act of, at each tire, waiting a variable time delay after collecting the data before transmitting the data words, the variable time delay at each tire differing from the variable time delay at other respective tires.

8. The method of claim 1 wherein the acts of collecting data and transmitting data word are repeated at an update frequency.

9. The method of claim 8 further comprising the acts of:

at each tire, detecting a signal indicative of vehicle speed; and when the signal exceeds a threshold, varying the update frequency, the threshold at each tire differing from the threshold at other respective tires.

10. The method of claim 1 wherein the data comprise data indicative of air pressure of the tire.

11. A method for transmitting data in a remote tire pressure monitoring system, the method comprising the acts of:

(a) at each tire of a plurality of tires of a vehicle, collecting data representative of a tire characteristic;

(b) transmitting a data word in response to the data;

(c) after a time delay, transmitting a next data word; and (d) repeating acts (b) and (c) for a predetermined number of data words, the time delay for each respective data word being defined according to a local copy of a repeating pattern common to the plurality of tires, the local copy being preassigned to the each tire so that transmission at each tire begins at a different location in the repeating pattern.

12. The method of claim 11 further comprising the act of: repeating acts (a) through (d) at an update frequency.

13. The method of claim 11 further comprising the acts of:

determining the time delay as a product of a time unit and a selected element of the local copy of the repeating pattern; and for subsequent words, determining the time delay as a product of the time unit and a sequentially selected element of the local copy of the repeating pattern.

14. The method of claim 13 further comprising the act of, at each tire, upon initiation of operation, selecting as a first selected element a different element of the local copy of the repeating pattern.

15. A method for interference-free communication of data in a remote tire pressure monitoring system including a plurality of transmitters associated with tires of a vehicle and a receiver in radio communication with the plurality of transmitters, the method comprising the acts of:
   (a) at each respective transmitter, establishing a respective repeating pattern of data elements, the respective repeating pattern being a unique version of a code which is common to each transmitter by having a different starting point of said code so that each transmitter has a unique transmission code;
   (b) collecting respective data representative of a tire characteristic of an associated tire;
   (c) transmitting respective first data words in response to the respective data;
   (d) at each transmitter, determining a respective first delay time using a respective first data element of the respective repeating pattern;
   (e) at each transmitter,
      (e1) waiting the respective first delay time,
      (e2) transmitting respective next data words,
      (e3) determining a respective next delay time using a respective next data element of the repeating pattern,
      (e4) repeating acts (e1), (e2) and (e3) until a predetermined number of data words has been transmitted; and
   (f) at the receiver, receiving without interference at least some data words and next data words from each of the plurality of transmitters.

16. The method of claim 15 wherein said act of determining the respective first delay time comprises the acts of:
   selecting the respective first data element; and
   producing the respective first delay time as a product of the respective first data element and a time unit.

17. The method of claim 16 said act of wherein the determining the respective next delay time comprises the acts of:
   selecting the respective next data element; and
   producing the respective next delay time as a product of the respective next data element and the time unit.

18. A transmitter for use in a tire pressure monitoring system of a vehicle having a plurality of tires, the transmitter comprising:
   a sensor for detecting an operating condition of a tire associated with the transmitter and producing an indication; and
   a controller coupled to the sensor and including:
      a data receiving circuit configured to receive the indication, and
      a control circuit which formats data words for communication to a remote receiver during a plurality of time windows having timing defined by a preassigned, respective different starting point of a predetermined, multiple-valued code common to the plurality of tires of the vehicle to form a unique code for the respective tire.

19. The transmitter of claim 18 further comprising a radio frequency (RF) circuit coupled to the controller for RF transmission of the data words to the remote receiver.

20. The transmitter of claim 18 further comprising a timing circuit coupled to the controller to establish reference timing, the controller being responsive to the reference timing to space the time windows in time according to a repeating pattern defined by the predetermined, multiple-valued code.

21. The transmitter of claim 20 wherein the transmitter is configured to transmit a data word during a time window, wait a predetermined time defined at least in part by the repeating pattern, and transmit a next data word during a next time window.

22. The transmitter of claim 21 further comprising a memory coupled to the control circuit for storing data defining the predetermined, multiple-valued code.

23. The transmitter of claim 21 wherein the repeating pattern comprises a plurality of integer numbers and wherein the control circuit includes a logic circuit configured to combine selected ones of the plurality of integer numbers with a time unit to establish the predetermined time.

24. The transmitter of claim 23 wherein the control circuit selects in sequence one integer number of the plurality of integer numbers for combination with the time unit, and, upon exhaustion of the sequence, repeats the sequence.

25. A method for communicating data in a remote tire pressure monitor system, the system including a plurality of transmitters associated with tires of a vehicle and a receiver configured to receive information from the plurality of transmitters, the method comprising the acts of:
   at each respective transmitter, collecting data representative of a characteristic of a tire associated with the transmitter at a data collection time;
   waiting a respective variable delay time which is defined by a respective phase of a code which is common to the plurality of transmitters, the respective phase having been preassigned to the respective transmitter, so that the respective variable delay time is different from respective variable delay times at other transmitters of the plurality of transmitters by having different starting point of said code for each respective tire; and
   transmitting respective data words in response to the data after the respective variable delay time has elapsed to reduce clashing of data words at the receiver.

26. A method for transmitting data in a remote tire pressure monitoring system, the method comprising the acts of:
   (a) at each respective tire of a plurality of tires of a vehicle, collecting data representative of a tire characteristic;
   (b) transmitting a respective data word based on the data;
   (c) determining a respective time delay as a product of a time unit and a selected element of a preassigned, respective repeating pattern which is based on a pattern common to the plurality of tires, the selected element defining a different respective local-starting point of the repeating pattern for each respective tire;
   (d) after the time delay, transmitting a respective next data word; and
   (e) repeating (c) and (d) for a predetermined number of data words, the respective time delay for each respective data word being defined according to a sequentially selected element of the preassigned, respective repeating pattern.

* * * * *

UNITED STATES PATENT AND TRADEMARK OFFICE
CERTIFICATE OF CORRECTION

PATENT NO. : 6,486,773 B1
DATED : November 26, 2002
INVENTOR(S) : Ivan A. D. Bailie et al.

It is certified that error appears in the above-identified patent and that said Letters Patent is hereby corrected as shown below:

Column 8,
Line 21, delete "her" and substitute -- further -- in its place.

Column 9,
Line 43, delete "said act of wherein the" and substitute -- wherein said act of -- in its place.

Column 10,
Line 57, delete "local-starting" and substitute -- local starting -- in its place.

Signed and Sealed this

Seventh Day of October, 2003

JAMES E. ROGAN
*Director of the United States Patent and Trademark Office*